US007457675B2

(12) United States Patent  (10) Patent No.: US 7,457,675 B2
Vesel  (45) Date of Patent: Nov. 25, 2008

(54) EXTERNAL STATUS ASSET MONITOR

(75) Inventor: Richard W. Vesel, Hudson, OH (US)

(73) Assignee: ABB Inc., Norwalk, CT (US)

( * ) Notice: Subject to any disclaimer, the term of this patent is extended or adjusted under 35 U.S.C. 154(b) by 457 days.

(21) Appl. No.: 11/204,002

(22) Filed: Aug. 15, 2005

(65) Prior Publication Data

US 2007/0035398 A1    Feb. 15, 2007

(51) Int. Cl.
G05B 15/00    (2006.01)
G05B 23/02    (2006.01)

(52) U.S. Cl. .............................. 700/83; 700/80; 702/185

(58) Field of Classification Search .................. 700/83, 700/80; 702/184, 185; 709/224
See application file for complete search history.

(56) References Cited

U.S. PATENT DOCUMENTS

| 6,385,496 | B1 * | 5/2002 | Irwin et al. ................... 700/87 |
| 7,110,906 | B2 | 9/2006 | Vesel |
| 7,283,914 | B2 * | 10/2007 | Poorman et al. .............. 702/56 |
| 2003/0009313 | A1 | 1/2003 | May et al. |
| 2003/0041142 | A1 * | 2/2003 | Zhang et al. ................ 709/224 |
| 2003/0056004 | A1 | 3/2003 | Argentieri et al. |
| 2005/0187649 | A1 * | 8/2005 | Funk et al. ................... 700/121 |
| 2006/0206289 | A1 * | 9/2006 | Stake et al. ................ 702/184 |

FOREIGN PATENT DOCUMENTS

| WO | WO0104748 | 1/2001 |
| WO | PCTUS2006031652 | 8/2006 |

* cited by examiner

*Primary Examiner*—Albert DeCady
*Assistant Examiner*—Steven R Garland
(74) *Attorney, Agent, or Firm*—Paul R. Katterle; Gienni DeSanbis

(57) ABSTRACT

The present invention is directed to a system and method of monitoring assets of an enterprise using a stand-alone software system and a process automation software system. The stand-alone software system is operable to generate a web page about a condition of the asset and to transmit data items for the condition in a single data string. The data items include a status of the condition and a URL of the web page. The process automation software system includes a human system interface (HSI) and a generic asset monitor having a changeable condition table. The generic asset monitor may be modified to create a custom asset monitor specific to the asset. The custom asset monitor is operable to monitor the status of the condition and the HSI is operable to display the data items and the web page from the stand-alone software system.

13 Claims, 15 Drawing Sheets

HXAM-G – Submit Fault Report

- ACD State: Most Server Unacknowledged
- Condition Name: Performance_Factor
- Time: Wednesday, July 21, 2004 9:10:56 AM
- Equipment: 12700
- WO Description: Check operation or retain Asset Monitor
- User Comment: Check operation or retain Asset Monitor
- Failure Date: Wednesday, July 21, 2004 9:10:56 AM
- Problem Reporter: Optimize IT
- General Ledger Account: 6900-332-000
- WO Priority: LOW
- Work Type: PM
- SubWork Type: MINOR
- Lead Craft:
- Username:
- Password:

☑ Dismiss after successful submittal

[Submit Fault Report] — 199

CMMS Submit Status:

FIG. 19

HXAM-G - Active Work Orders

CMMS Objects: HXAM-G

| Work Order | Description | Location | Equipment | User Comment | Failure Date | Status | Status Date | Priority | Repo |
|---|---|---|---|---|---|---|---|---|---|
| 5071 | Validate maintenance or Operating Point improveme | BPM3100 | 12700 | Validate maintenacne or Operating Point improvement | Friday, July 16, 2004 7:30:00 AM | WAPPR | Monday, August 16, 2004 1:34:00 PM | 3 | Opti |
| 5070 | Validate operation of Heat Exchanger | BPM3100 | 12700 | Validate operation of Heat Exchanger | Monday, August 16, 2004 11:47:00 AM | WAPPR | Monday, August 16, 2004 1:33:00 PM | 3 | Opti |
| 5069 | Validate operation of Heat | BPM3100 | 12700 | Validate operation of Heat Exchanger | Monday, August 16, 2004 | WAPPR | Monday, August 16, 2004 1:31:00 | 3 | Opti |

RTPU: RTPI_AM - ASSET MONITORING STATUS

| Asset Monitor | LogicBlock Parameters | Coditions | Output Records | Input Records |

| | |
|---|---|
| Status: | ○ good |
| Last Executed: | Tuesday, February 15, 2005 8:34:55 AM |
| Last Started: | Tuesday, February 15, 2005 8:31:02 AM |
| Execution Status: | Executions Counter: 47-Submitted ABBACDs: 4-Last Execution Length (ms): 2 |
| Execution Interval (ms): | 5000 |
| Asset Parameters: | <AssetParameters><THIN_CLIENT_MENU_WEB_APP_LOCATION>/RTAOThinClientMenu,/THIN_CLIENT_MENU_ |
| Asset URL: | http://USABBCLEW01843.CLEUSAB |

| Asset Monitor Category: Checks Equipment Status | |
|---|---|
| Status: | ○ good - Tuesday, February 15, 2005 8:31:02 AM |
| Logic: | ProgID:ESAM.Logic - Version: 1.1.0 |
| Executions Status: | AssetMonitors:1, Executions:47 |
| StartupConfiguration: | <StartupConfiguration/> |

FIG.21  *212*

EXTERNAL STATUS ASSET MONITOR

BACKGROUND OF THE INVENTION

The present invention is directed toward asset monitoring and, more particularly, toward a system and method for monitoring assets using a stand-alone asset monitoring system in conjunction with a process automation system.

An enterprise, such as an industrial plant, having a plurality of assets for performing a process typically has a process automation system for controlling the process and a plurality of "stand-alone" systems for monitoring the assets. In order to provide operating personnel with a single window for viewing information from both the process automation system and the stand-alone systems, the process automation system is often provided with interfaces for receiving information from the stand-alone system. For example, in a System 800xA™ process automation system available from the assignee of the present invention, standard asset monitors are provided for retrieving data from stand-alone systems. Each of these standard asset monitors is specifically developed for a particular stand-alone system and implements highly specific analysis algorithms to determine equipment status. Such customization is rather complicated and increases the costs for developing and maintaining standard asset monitors. These costs make standard asset monitors economically feasible only for those stand-alone systems that are widely used. As a result, standard asset monitors are typically not available for less widely used stand-alone systems.

Based on the foregoing, there exists a need in the art for a simplified system and method for monitoring assets using a stand-alone asset monitoring system in conjunction with a process automation system. The present invention is directed to such a system and method.

SUMMARY OF THE INVENTION

In accordance with the present invention, a method is provided for monitoring an asset in an enterprise. In accordance with the method, at least one computer with a viewing monitor and a stand-alone software system for monitoring the asset are provided. The stand-alone software system is runnable on the at least one computer and is operable to transmit data items for a condition of the asset. The data items include a description of the condition and a status of the condition. A process automation software system is also provided and is runnable on the at least one computer. The process automation software system includes a human system interface (HSI) and a generic asset monitor having a changeable condition table with a generic condition entry. The generic asset monitor is modified to create a custom asset monitor specific to the asset. The modification includes changing the generic condition entry in the condition table to correspond to the condition of the asset. The data items are received from the stand-alone software system in the process automation software system and the status of the condition is monitored in the custom asset monitor. The data items are displayed in the HSI.

Also provided in accordance with the present invention is a system for monitoring an asset of an enterprise. The system includes at least one computer with a viewing monitor and a stand-alone software system for monitoring the asset. The stand-alone software system is runnable on the at least one computer and is operable to transmit data items for a condition of the asset. The data items include a description of the condition and a status of the condition. A process automation software system is also runnable on the at least one computer and includes a human system interface (HSI) and a generic asset monitor having a changeable condition table with a generic condition entry. A software development tool is operable, to make modifications to the generic asset monitor to create a custom asset monitor specific to the asset. These modifications include changing the generic condition entry in the condition table to correspond to the condition of the asset. A communication network connects the process automation system to the stand-alone software system so that the process automation system can receive the data items from the stand-alone software system. The custom asset monitor is operable to monitor the status of the condition and the HSI is operable to display the data items on the viewing monitor of the at least one computer.

Further in accordance with the present invention, a method is provided for use in an enterprise having an asset. In accordance with the method, data is gathered about at least one condition of the asset. A status of the at least one condition is determined from the gathered data. For each condition, a web page is generated containing information about the condition and data items are transmitted in a single data string. The data items include the status of the condition and a URL for the web page. The data string is received and parsed and the status is displayed.

BRIEF DESCRIPTION OF THE DRAWINGS

The features, aspects, and advantages of the present invention will become better understood with regard to the following description, appended claims, and accompanying drawings where:

FIG. 19 is a screenshot of the plant explorer workplace showing a submit fault report view for the heat exchanger asset monitor;

FIG. 20 is a screenshot of the plant explorer workplace showing an active work orders view for the heat exchanger asset monitor;

FIG. 21 is a screenshot of the plant explorer workplace showing an asset monitor status view of the new asset monitor.

DETAILED DESCRIPTION OF EXEMPLARY EMBODIMENTS

Figure 1:
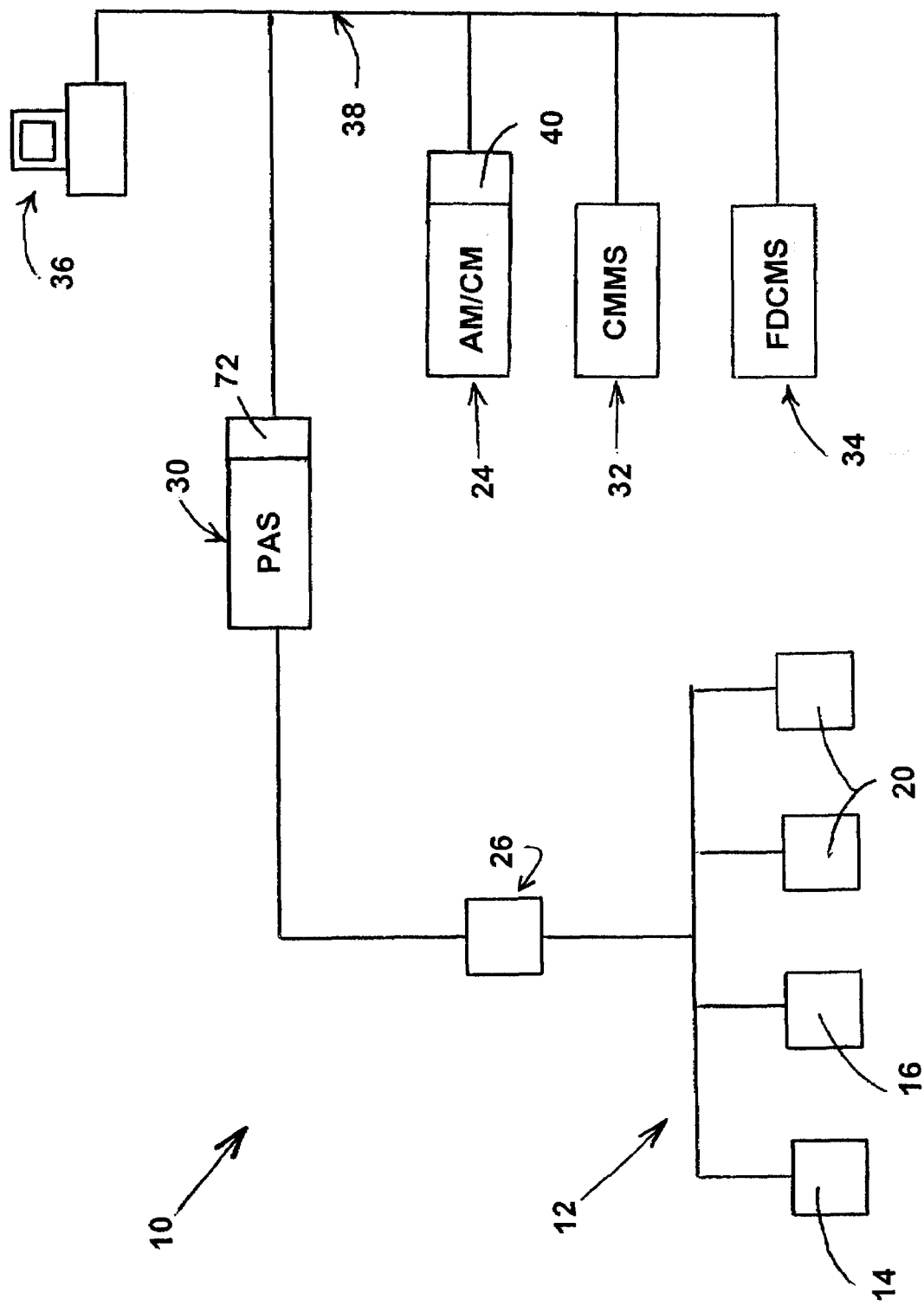
FIG. 1 is a schematic view of an enterprise having a plurality of assets.

It should be noted that in the detailed description that follows, identical components have the same reference numerals, regardless of whether they are shown in different embodiments of the present invention. It should also be noted that in order to clearly and concisely disclose the present invention, the drawings may not necessarily be to scale and certain features of the invention may be shown in somewhat schematic form.

Below is a list of acronyms used in the specification and their respective meanings:

"CMMS" shall mean computerized maintenance management system

"DCOM" shall mean distributed component object model.

"DLL" shall mean dynamic link library.

"FDCMS" shall mean field device calibration and management system

"HTML" shall mean Hypertext Markup Language.

"HTTP" shall mean Hypertext Transfer Protocol.

"ODBC" shall mean Open Data Base Connectivity, which is a method of communication to client/server databases. ODBC is part of Microsoft's Windows Open Systems Architecture, which provides a series of application program interfaces to simplify and provide standards for various programming activities.

"OPC" shall mean object linking and embedding for process control, which is published industrial standard for system inter-connectivity.

"OPC DA" shall mean OPC Data Access, which is a published industrial standard for providing access to real-time process data.

Referring now to FIG. 1 there is shown a block diagram of an enterprise 10 that can benefit from the use of the present invention. The enterprise 10 includes a plurality of assets 12 for, inter alia, performing at least one process. The enterprise 10 may include a single facility or a plurality of facilities located in one or more geographic locations. The enterprise 10 may be a wind farm and the process may be generating electricity from wind. In such a case, the assets 12 may include a motor 14, a heat exchanger 16, and windmills 20. It should be appreciated, however, that the present invention is in no way limited to use in a wind farm.

For purposes of monitoring and controlling the assets 12, the enterprise 10 may be provided with one or more separate asset monitoring/condition monitoring (AM/CM) systems 24, process field devices 26, a process automation system 30 and preferably a computerized maintenance management system (CMMS) 32, a field device calibration and management system (FDCMS) 34 and a remote client 36, all of which are interconnected by a network 38.

Figure 2:
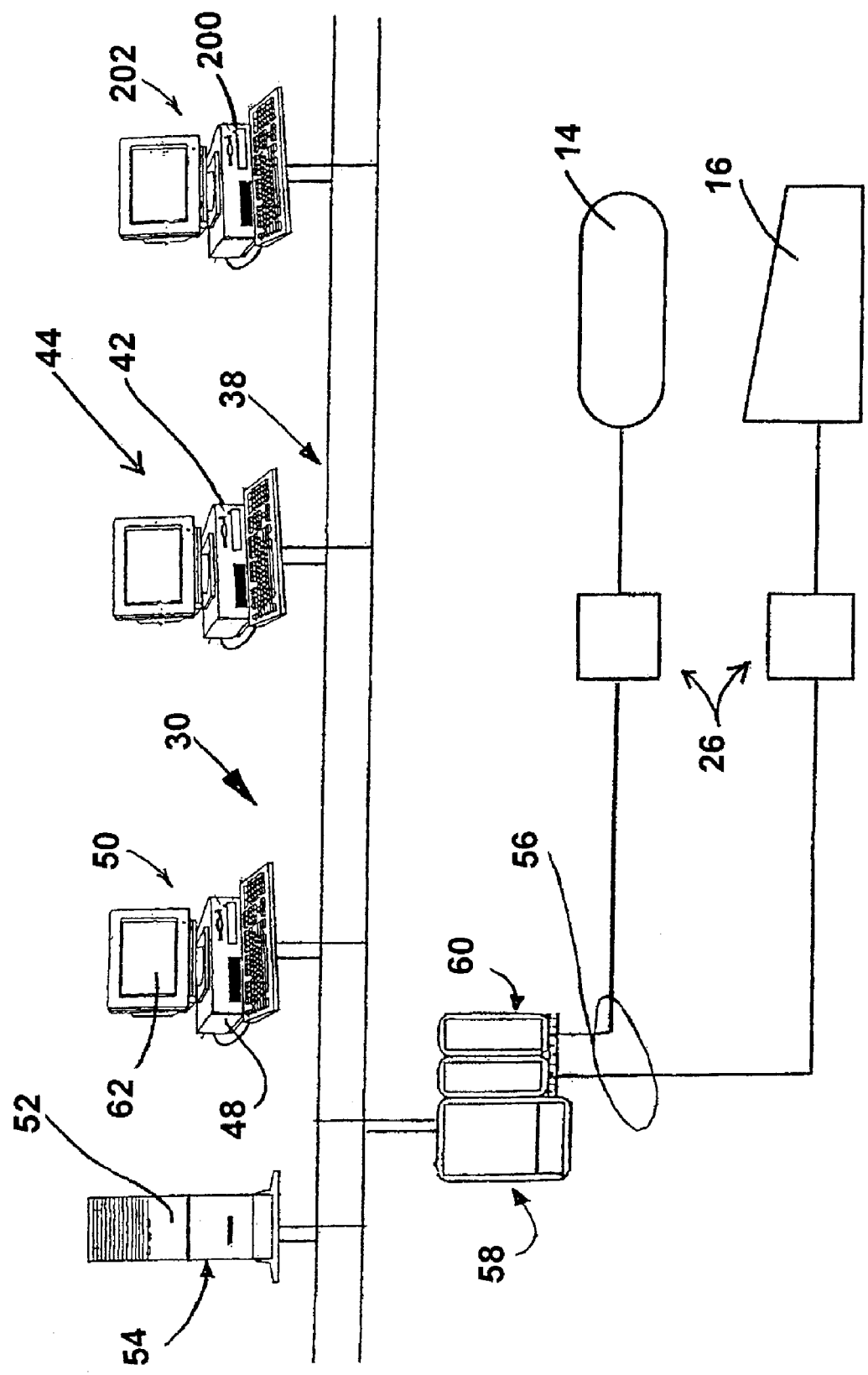
FIG. 2 is a schematic view of a process automation system connected to assets of the enterprise.

The AM/CM system 24 is a stand-alone software application (i.e., a software application capable of running independently of other software applications) that gathers data about an asset 12 and uses this data to determine a status of at least one condition of the asset 12. More specifically, the AM/CM system 24 may be a real-time data acquisition and analysis system that, inter alia, monitors the operation of the motor 14. An example of such a real-time data acquisition and analysis system is Real TPI™, which is available from the assignee of the present application, ABB Inc. In such an embodiment, the AM/CM system 24 may receive data from the motor 14 through the network 38. The AM/CM system 24 has an OPC DA server 40 and a web server 41 and may further include a database system, an application program and a human system interface (HSI) with a browser. With reference now to FIG. 2, the AM/CM system 24 may run on a CPU 42 of a work station 44. Alternately, the AM/CM system 24 may run on a CPU 48 of a control workstation 50 in the process automation system 30, or on a CPU 52 of a server computer 54 in the process automation system 30.

The AM/CM system 24 gathers data about the motor 14 and uses the data to monitor conditions of the motor 14, such as performance, availability, quality and overall equipment effectiveness (OEE). The AM/CM system 24 generates a web page and a data string 46 for each such condition. The web server 41 makes the web pages available to web clients on the network 38, while the OPC DA server 40 makes the data strings 46 available to OPC DA clients on the network 38. As will be more fully discussed below, the data string 46 for a condition includes a uniform resource locator (URL) for the web page for the condition.

Process Field Devices.

The process field devices 26 include monitoring devices (such as sensors and transmitters) and control devices (such as valves and drives) for monitoring and controlling the process. The process field devices 26 communicate operating values of the process to the process automation system 30 over a field network 56, which may utilize shielded twisted pair wires, coaxial cables, fiber optic cables, or wireless communication channels.

Process Automation System.

Figure 3:
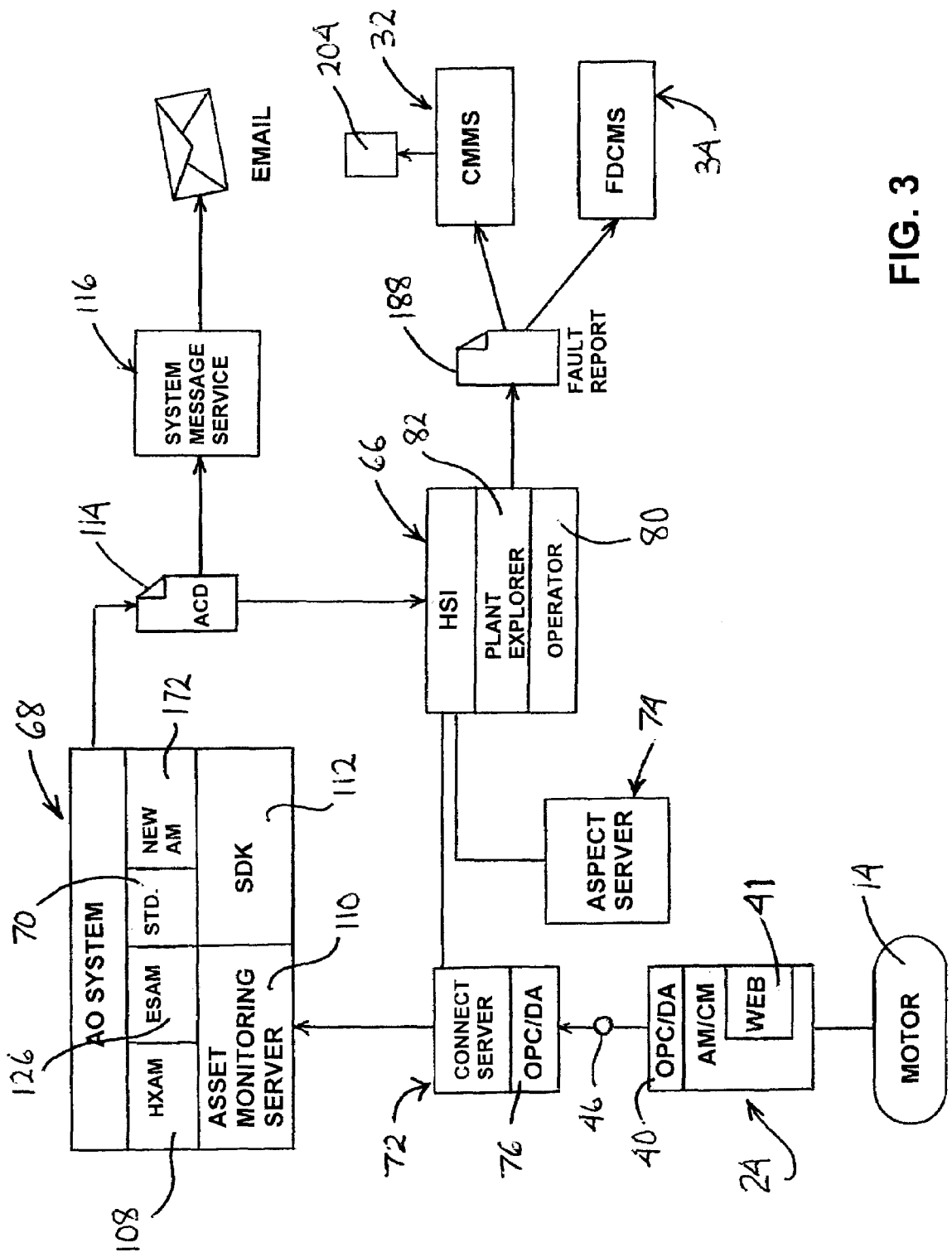
FIG. 3 is a schematic view of the enterprise showing the flow of information from one of the assets through a stand-alone asset monitoring system and the process automation system to a computerized maintenance management system.

Referring now to FIGS. 2 and 3, the process automation system 30 is preferably a distributed control system, such as a System 800xA distributed control system, which is commercially available from the assignee of the present invention, ABB Inc. The process automation system 30 generally includes at least one control work station 50 and one or more controllers 58. Input signals from the field devices 26 are communicated over the field network 56 to the network 38 by 4-20 mA signaling and/or by one or more of the conventional control protocols, such as the HART® protocol, the Foundation™ Fieldbus protocol, or the Profibus protocol. For any of the field devices 26 communicating via the Foundation™ Fieldbus protocol, the field network 56 comprises HSE/H1 linking devices, which connect the field devices 26 to a high speed Ethernet subnet, which is connected to the network 38 through an FF HSE communication interface of the controller(s) 58 or through an FF OPC server (not shown). For any field devices 26 communicating via the Profibus protocol, the field network 56 comprises DP/PA linking devices, which connect the field devices 26 to a Profibus-DP line, which is connected to the network 38 through a Profibus communication interface of the controller(s) 58 or through a Profibus OPC server (not shown). For any field devices 26 communicating via 4-20 mA signaling and/or the HART® protocol, the field network 56 typically comprises shielded twisted pair wires, which connect the field devices 26 to an I/O subsystem 60, which includes one or more I/O modules with one or more associated module termination units, as is shown in FIG. 2. The I/O subsystem 60 is connected by a module bus to the controller (s) 58, which is/are connected to the network 38.

The network 38 interconnects the control work station 50, the controller(s) 58 and the AM/CM system 24. The network 38 includes a pair of redundant Ethernet cables over which information is communicated using the Manufacturing Message Specification (MMS) communication protocol and a reduced OSI stack with the TCP/IP protocol in the transport/ network layer. Together, the network 38 and the field network 56 help form a communication link over which information may be transmitted between the field devices 26 and clients.

The controller(s) 58 contain(s) control programs for controlling the process of the enterprise 10 and sub-processes thereof. The control programs utilize operating values from the field devices 26, which are received by the controller(s) 58 from the I/O subsystem 60. The control programs are written in one or more of the five IEC 61131-3 standard languages: Ladder Diagram, Structured Text, Function Block Diagram, Instruction List and Sequential Function Chart. Outputs from the control programs are transmitted to the control devices of the process field devices 26 over the field network 56.

The control work station 50 is a personal computer (PC) with a central processing unit (CPU) 48 and a monitor 62 for providing visual displays to an operator. The CPU 48 has an operating system running thereon, which is a Windows® operating system available from Microsoft Corporation. A human system interface (HSI) 66 and an asset optimization system 68 with standard asset monitors 70 run on the operating system of the control work station 50. A connectivity server 72 and an aspect server 74 may also run on the control work station 50, or may instead run on the server computer 54.

The connectivity server 72 includes an OPC server network based on Microsoft's OLE (now Active X), COM, and DCOM technologies. The OPC server network includes an OPC DA server 76 for communicating with the OPC DA server 40 of the AM/CM system 24 and a controller OPC server that makes information from the controller(s) 58 available to any OPC client connected to the network 38, such as the HSI 66. As set forth above, an FF OPC server and/or a Profibus server may also be provided to connect the field devices 26 to the network 38 without having to be connected to the controller(s) 58. The FF OPC server and the Profibus server are also based on Microsoft's OLE (now Active X), COM, and DCOM technologies that make information available to any OPC client on the network 38.

The aspect server 74 includes an aspect directory containing all aspect objects and their aspects, as well as an aspect framework (AFW) server. The AFW server is operable to wrap together HTML pages (aspects) for an object in a web-compliant AFW file that can be launched from an object tree in the HSI 66. The aspect server 74 implements a method of organizing information using aspect objects (or simply "objects") and aspects associated with the objects. An object represents physical matter (such as an asset 12) or virtual matter (such as a function) and acts as a holder or container for information (such as run time data) concerning the object. Information concerning an object is contained in its aspects. An aspect is an assembly of information describing certain properties of an object, such as functional properties, physical construction properties and location properties. Information in an aspect is presented in a view, which may be a list, a table, a diagram, a drawing, or a graphic. An aspect may have more than one view. An aspect object methodology that may be utilized is set forth in U.S. Pat. No. 6,694,513 to Andersson et al., which is assigned to a sister company of the assignee of the present invention and is hereby incorporated by reference.

The aspect object methodology of the process automation system 30 utilizes a plurality of object hierarchies or structures, including: aspect system, functional, locational and control. The aspect system structure contains all aspects, their types and categories. The functional structure shows where a particular object fits into a functional context. For example, the functional structure would show which control loops are associated with the motor 14 and which field devices 26 are associated with each control loop. The locational structure shows where an object fits into the physical (geographical context). For example, the locational structure would show exactly where in the enterprise 10 the motor 14 is located. The control structure shows where a software function or hardware device can be found in the process automation system 30 or the AM/CM system 24. For example, the control structure would show which analog/digital output signals control the motor 14, which output boards carry the output signals and how these signals connect to the control program controlling the motor 14.

In the HSI 66, objects and aspects are graphically represented by icons. In the description below, when reference is made to an object or aspect, it should be understood that the reference may be to the icon for the object or aspect and/or to its associated object or aspect, depending on the context.

The HSI 66 has a client/server architecture and may have communication based on OPC. A suitable human system interface that may be utilized for the HSI 66 is Process Portal™, which is commercially available from the assignee of the present invention, ABB Inc. The HSI 66 a plurality of client that may be utilized. Each workplace comprises a collection of user-interactive functions (such as tool bars, faceplates, windows, pull-down menus, buttons, scroll bars, iconic images, wizards, etc.) that are combined for a particular use, such as controlling the process, maintaining assets 12 in the enterprise 10, or configuring a model of the enterprise 10. Enterprise personnel may select a particular workplace from a workplace login page of the HSI 66. Two of the workplaces that may be selected are an operator workplace 80 and a plant explorer workplace 82.

Figure 4:
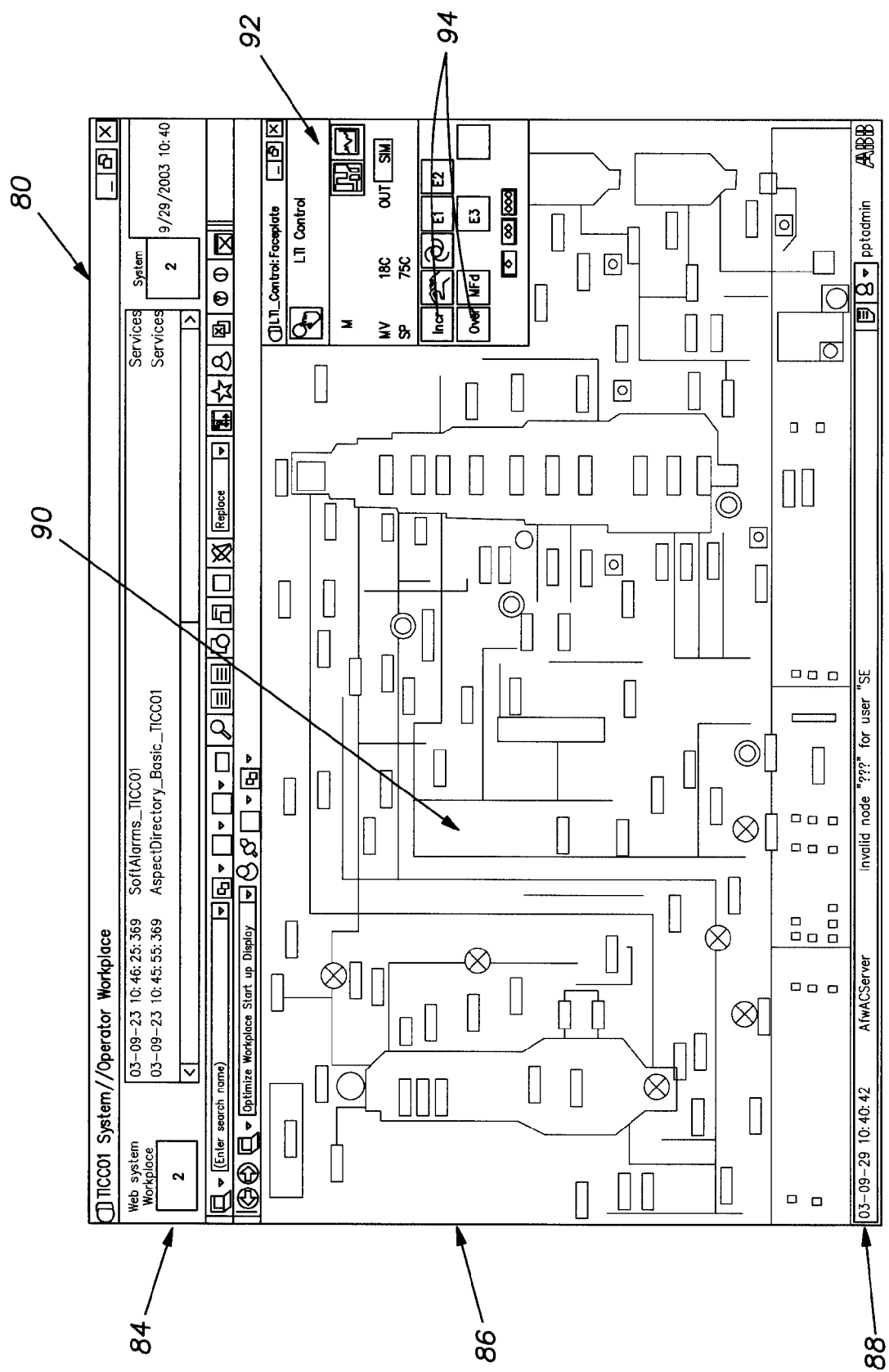
FIG. 4 is a screenshot of an operator workplace of the process automation system.

Referring now to FIG. 4, the operator workplace 80 is configured for process operators responsible for controlling the process. The operator workplace 80 includes an upper application bar 84, a central display area 86 and a lower status bar 88. The application bar 84 includes an alarm band that provides a summary display for selected alarm lists, as well as links to the alarm lists, and an alarm line that shows three of the latest alarms. The status bar 88 includes an operator message line showing the latest operator message from the process automation system 30, a button for accessing a list of the operator messages, and a current user tool for showing the identity of the current user. The display area 164 is the area from which the process is controlled. The display area 86 is used to show aspects, such as graphic displays, faceplates, alarm display and/or trend displays. For example, in FIG. 4, both a graphic display 90 and a faceplate 92 are shown. The graphic displays (such as graphic display 90) and the faceplates (such as faceplate 92) utilize Microsoft ActiveX Controls and include both static and dynamic elements. Dynamic actuation elements in the graphic displays and faceplates (such as buttons 94) are interconnected with the control programs in the controller(s) 58 and may be manipulated by an operator to: initiate state changes (e.g. block alarms or switch from manual to auto mode); change process values, limits and set-points; and acknowledge alarms. In addition to containing dynamic actuation elements, the graphic displays and the faceplates typically display operating values of the process.

Figure 5:
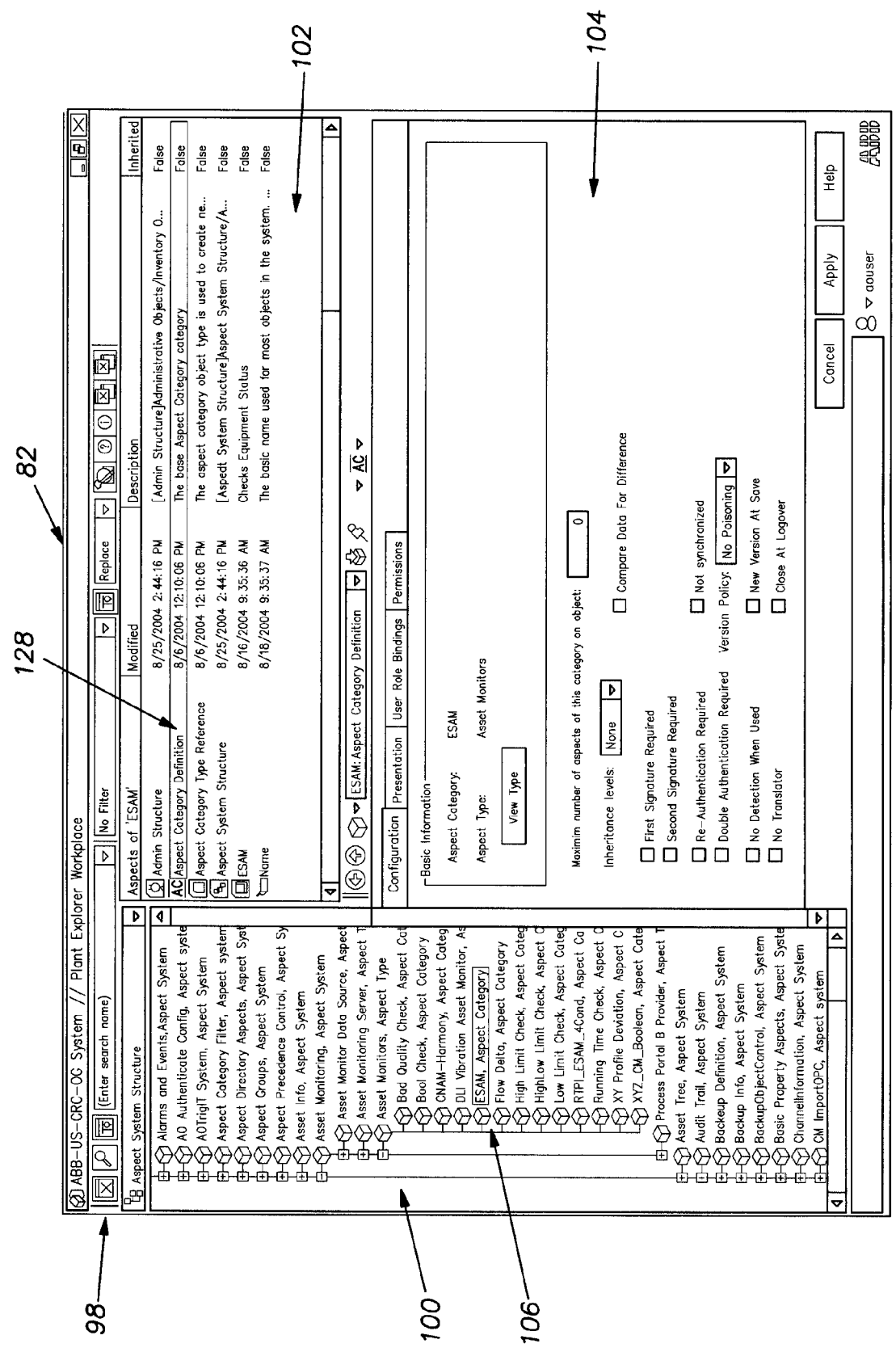
FIG. 5 is a screenshot of a plant explorer workplace of the process automation system showing an ESAM aspect in an aspect system structure.

Referring now to FIG. 5, the plant explorer workplace 82 is used to explore and build hierarchically structured models of the enterprise 10. The plant explorer workplace 82 includes an application bar 98 and a plurality of frames or areas, including an aspect object area 100, an aspect list area 102 and a preview area 104. The application bar 98 includes a fixed display area, a tool collection and shortcuts. The aspect object area 100 is where the object browser displays a list or tree 106 of objects for a selected object structure (functional, locational or control), with each root object at a top level and its child objects at a lower or leaf level. An object can be accessed by right clicking on the object in an object tree 106, which opens a context menu containing a number of actions that can be performed. The aspect list area 102 displays all aspects of a currently selected object in the object tree 106. The preview area 104 displays the aspect currently selected in the aspect list area 102.

Referring back to FIG. 3, the asset optimization system 68 integrates asset monitoring and decision support applications with the HSI 66, as well as the CMMS 32 and typically the FDCMS 34. A strategic maintenance management software package sold under the tradename MAXIMO® by MRO Software, Inc. has been found suitable for use as the CMMS 32, while a device management software package sold under the tradename DMS by Meriam Process Technologies has been found suitable for use as the FDCMS 34. The asset optimization system 68 includes the standard asset monitors 70, an asset monitor 108 for the heat exchanger 16 and other standard asset monitors that may monitor other physical components of the process and/or process field devices 26 and information technology assets of the process automation system 30. The asset optimization system 68 also includes an asset monitoring server 110 and a software development kit (SDK) 112 with an add-in spreadsheet program 113 having a graphical user interface (GUI). The SDK 112 may be based on the Visual Basic® program language and development environment available from Microsoft Corporation and the spreadsheet program may be the EXCEL™ spreadsheet program, which is also available from Microsoft Corporation. The asset optimization system 68 may have an architecture substantially in accordance with the AO architecture described in U.S. patent application Ser. No. 09/770,167 (Publication Number US2002/0103828A1), which is assigned to the assignee of the present invention and is hereby incorporated by reference.

The asset monitoring server 110 interacts with the connectivity server 72 and/or the FF OPC server and/or the Profibus server to receive operating values from the process field devices 26 over the network 38. In addition, the asset monitoring server 110 receives information from the AM/CM system 41 over the network 38, via the OPC/DA server 76.

The standard asset monitors 70 may be written in Visual Basic® using the SDK 112 and their parameters are defined using the spreadsheet program. The standard asset monitors 70 can be configured to perform Boolean checks, quality checks, runtime accumulation checks, high, low, high/low limit checks, XY profile deviation checks and flow delta checks. A condition of an asset monitor 70 can be an operating characteristic (such as vibration) of an asset being monitored (such as the motor 14), while a subcondition can be the quality or status of the condition (such as "normal" or "extreme"). An asset monitor 70 can be configured such that if a subcondition is met or is present (such as "extreme"), the asset monitor 70 creates an asset condition document 114, which is an XML file containing all information necessary to describe an asset condition. The asset monitor 70 transmits the asset condition document 114 to the HSI 66 and may also reformat the asset condition document 114 and send it to a system message service 116 for delivery to plant operating personnel via email and/or pager. The system message service 116 permits plant operating personnel to subscribe to a plurality of asset monitors 70 for which the plant operating personnel desire to receive status change information.

Figure 6:
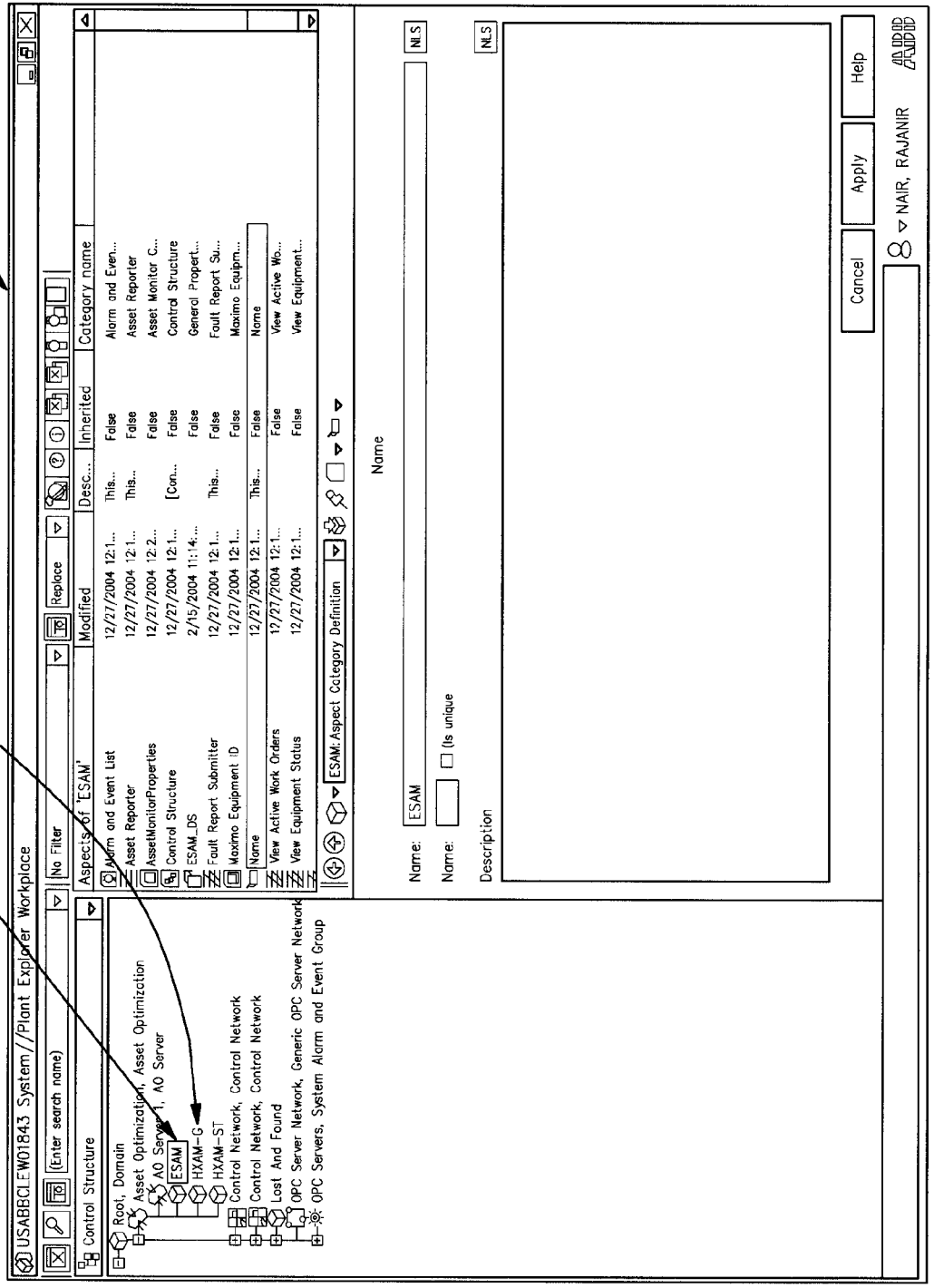
FIG. 6 is a screenshot of the plant explorer workplace showing an ESAM object in a control structure.

Referring now to FIG. 6, the asset monitor 108 for the heat exchanger 16 includes an object 120 with an asset monitor aspect. The asset monitor 108 for the heat exchanger 16 may have the same construction and function as the heat exchanger asset monitor disclosed in applicant's co-pending patent application (Ser. No. 10/896,732) entitled A SYSTEM AND METHOD FOR MONITORING THE PERFORMANCE OF A HEAT EXCHANGER, which is hereby incorporated by reference. With such a construction, the asset monitor 108 provides a measure of the performance (referred to as "E") of the heat exchanger 16 without using any information concerning the physical construction of the heat exchanger 16. The measure of performance, E, is calculated using only differential temperatures. The asset monitor aspect provides a detailed view of the conditions and the subconditions of the asset monitor 108. The status of the subconditions is provided by text, as well by color, with the color being selected based on the nature of the status.

ESAM

In addition to the standard asset monitors 70 and the asset monitor 108, the asset optimization system 68 also includes an External Status Asset Monitor (ESAM) 126. The ESAM 126 is a generic or template asset monitor that can be copied and quickly modified to create a customized asset monitor for receiving and analyzing condition data from a separate or stand-alone AM/CM system, such as the AM/CM system 24. The ESAM 126 uses a conventional data exchange standard (such as OPC-DA) to acquire condition data in a predetermined format from an AM/CM system. The predetermined format for condition data is in the form of data strings 46. A single data string 46 is provided for each condition of the asset being monitored by an AM/CM system. The data string 46 is divided into sections with a series of curly braces ("{ }"). The sections of the data string 46 include the severity of the condition, a subcondition of the condition, a description of the condition, a possible cause of the condition, a suggested action and a URL for a web-accessible file in an AM/CM system containing information about the condition. The data string 46 has the following form:

{severity}{subcondition}{description}{possible cause}{suggested action}{URL}

Each of the sections, except the severity section, can contain from 0 to 250 characters. The severity section will contain a number that may is in a range of 0-1000, or in a range of −1 to −1,000. A "1" for the severity number indicates a normal subcondition for the condition. Severity numbers greater than 1 indicate a non-normal subcondition, with the higher the number, the greater severity. If the ESAM 126 receives a "0" in the severity section of the data string 46, the ESAM 126 will interpret the "0" as indicating that an AM/CM system is not evaluating the relevant condition because the condition has been intentionally disabled. The ESAM 126 will put the condition into a quality of "good" and will provide the condition with a default description of "AM/CM System Intentionally Disabled", unless the AM/CM system has provided its own description in the description section of the data string. The ESAM 126 will set the subcondition to a default of "Not Evaluated" and the severity will be changed and passed thru at a value of "1".

If the ESAM 126 receives a negative severity number, the ESAM 126 interprets the negative severity number to indicate that an AM/CM system is identifying an internal error state for evaluation of the relevant condition. This may be due to receiving bad data, or some other internal problem. The ESAM 126 will put the condition into a quality of "badDeviceFailure" and will provide the condition with a default description of "CM System has identified an error", unless the AM/CM system has provided its own description in the description section of the data string. The ESAM 126 will set the severity of the condition to the absolute value of the negative severity in the severity section of the data string and the subcondition will be set to "Error".

The requirement that an AM/CM system publish condition data in the predetermined format may require the AM/CM system to be modified, such as may occur when the AM/CM system is provided by a party other than the party providing the process automation system 30. In such a case, the AM/CM system may be modified by its provider, an end user, a third party integrator or the provider of the process automation system 30. The modification may occur in response to the conveyance of the predetermined format from the provider of the process automation system 30 to the provider of the AM/CM system, the end user, or the third party integrator by direct correspondence, such as through email or regular mail, or by publication of the predetermined format, such as through trade journals, marketing literature, etc. Thereafter, the provider of the AM/CM system may, as a part of its standard offering, provide the AM/CM system with the ability to publish condition data in the predetermined format.

The ESAM 126 includes an ESAM aspect category definition (ESAM aspect) 128, an ESAM object definition (ESAM object) 130 and an ESAM logic implementation. The ESAM aspect 128 is located in the aspect system structure of the plant explorer workplace 82, as shown in FIG. 5 The ESAM aspect 128 is an aspect framework (AFW) file that contains a condition table 132 having at least one generic condition with a generic identifier, such as "condition 1", and at least two subconditions for the generic condition, namely "normal" and "fault". The ESAM object 130 is located in the control structure of the plant explorer workplace 82, as shown in FIG. 6. The ESAM object 130 is an AFW file that contains all the aspects that are required for the definition of an object of an asset to be monitored. The ESAM logic implementation is a dynamic link library (DLL) file that contains ESAM logic.

Figure 7:
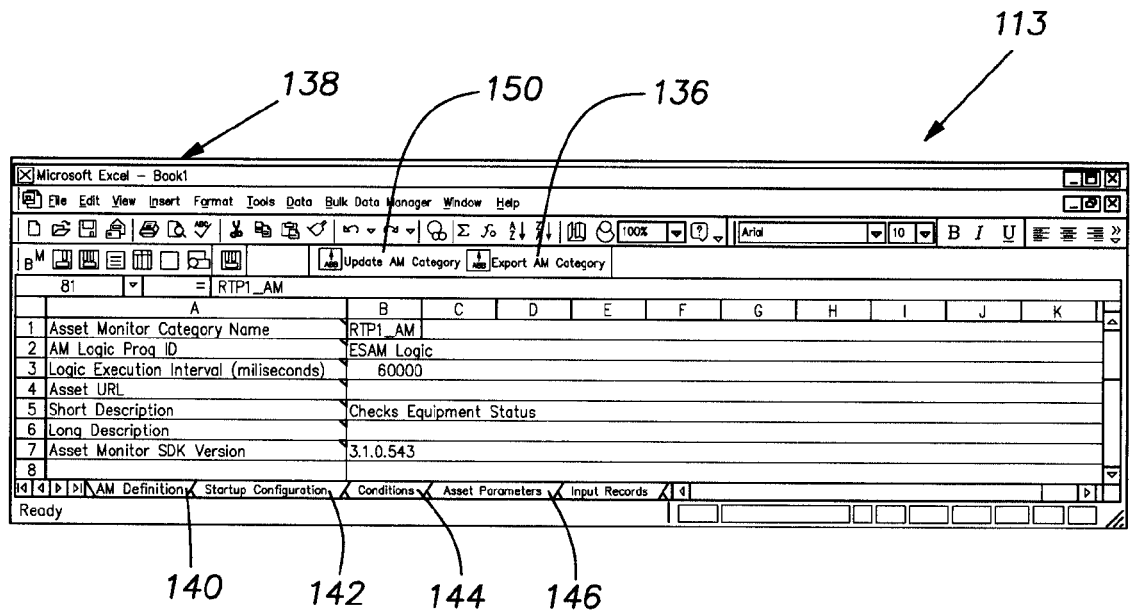
FIG. 7 is a screenshot of a workbook in a spreadsheet program of the process automation system showing definitions of the ESAM aspect.
Figure 8:
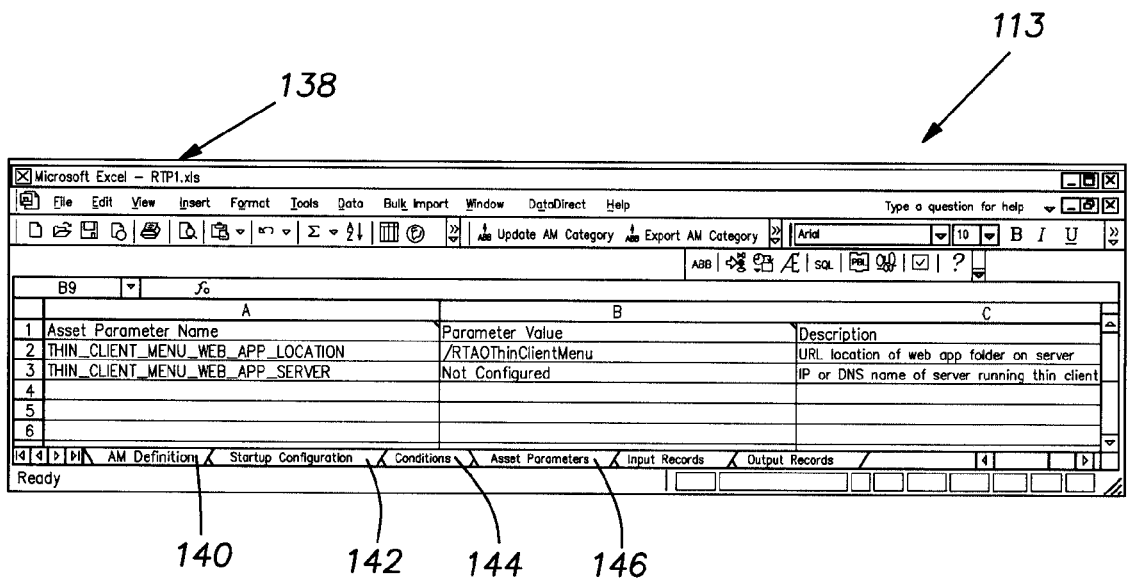
FIG. 8 is a screenshot of the workbook in the spreadsheet program showing parameters of a server running a thin client web application.
Figure 9:
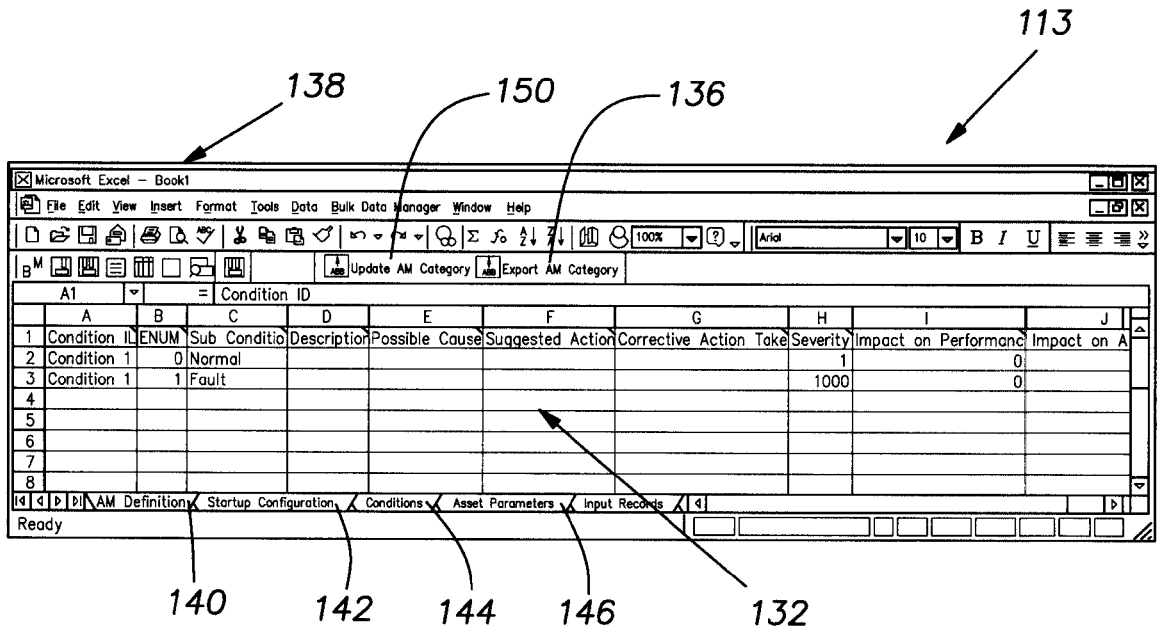
FIG. 9 is a screenshot of the workbook in the spreadsheet program showing a condition table of the ESAM aspect.
Figure 10:
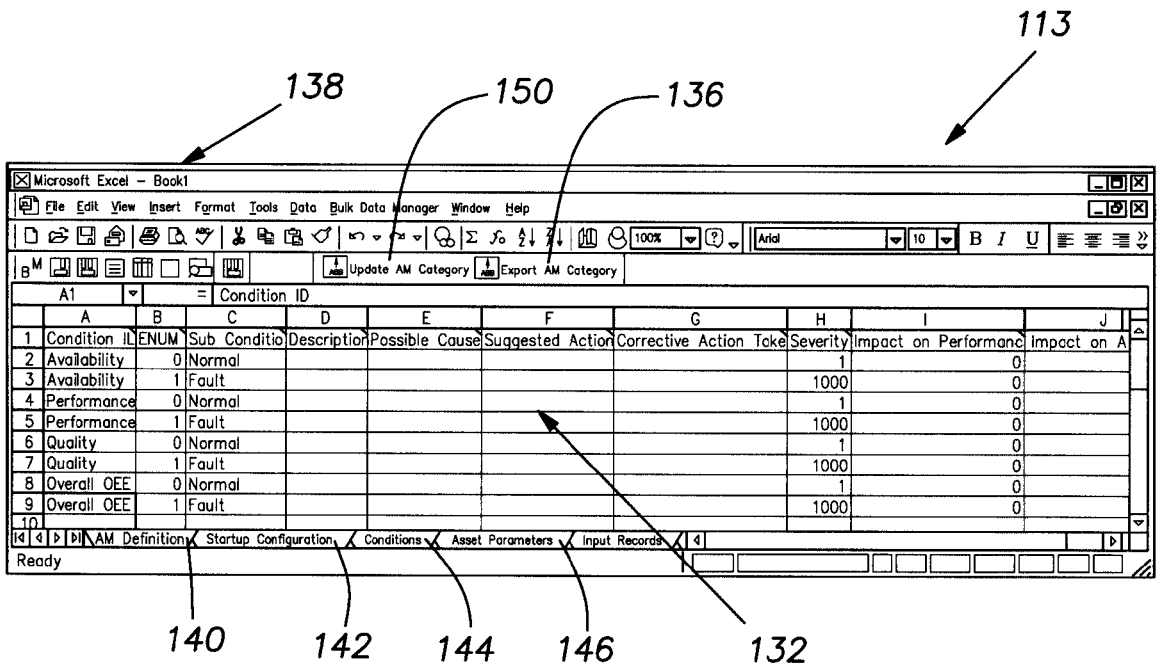
FIG. 10 is a screenshot of the workbook in the spreadsheet program showing the condition table of the ESAM aspect after it has been modified to form a new AM aspect.

The process of modifying and implementing the ESAM 126 to produce a custom asset monitor for an AM/CM system will now be described with regard to the AM/CM system 24 and the motor 14 it is monitoring. The modification process includes modifying the ESAM aspect 128 in the spreadsheet program 113 of the SDK 112. The ESAM aspect 128 is exported into the spreadsheet program 113 by an export tool of the spreadsheet program 113, which is activated by a tool button 136, as own in FIG. 7 Inside the spreadsheet program 113, the ESAM aspect 128 is opened as a workbook 138 with a plurality of tabs, including an AM Definition tab 140, a Startup Configuration tab 142, a Conditions tab 144 and an Asset Parameters tab 146, as shown in FIGS. 7-10. After clicking on the AM Definition tab 140 to open the same, cell B1 is modified to change the name of the ESAM aspect 128 from "ESAM" to a desired new name, such as a name indicative of the AM/CM system 24 and/or the motor 14. For example, the name of the ESAM aspect 128 may be changed to "RTPI AM", as shown in FIG. 7. In this manner, the ESAM aspect 128 is copied to create a new AM aspect 148. The Asset Parameters tab 146 is then opened and the IP or DNS name of the server running a thin client web application (such as remote client 36) is entered, as shown in FIG. 8. The Conditions tab 144 is then clicked on, which causes the condition table 132 to be displayed, as shown in FIG. 9. As described above, the condition table 132 has one generic condition with a generic identifier, i.e. "condition 1", and two subconditions for the generic condition, namely "normal" and "fault". A plurality of new conditions may be created by duplicating rows 2 and 3 of the condition table 132 for the required number of new conditions. The names of the new conditions and the generic condition in column A are then changed to the name of the conditions of the AM/CM system 24. For example, the name "condition 1" for the generic condition may be changed to "Availability" and the names of the new conditions may be changed to "Performance", "Quality" and "Overall OEE", as shown in FIG. 10. After the condition table 132 has been modified, the new AM aspect 148 is saved into the aspect system structure using an Update AM Category tool in the spreadsheet program 113, which is activated by a tool button 150. The spreadsheet program 113 is then closed.

Figure 11:
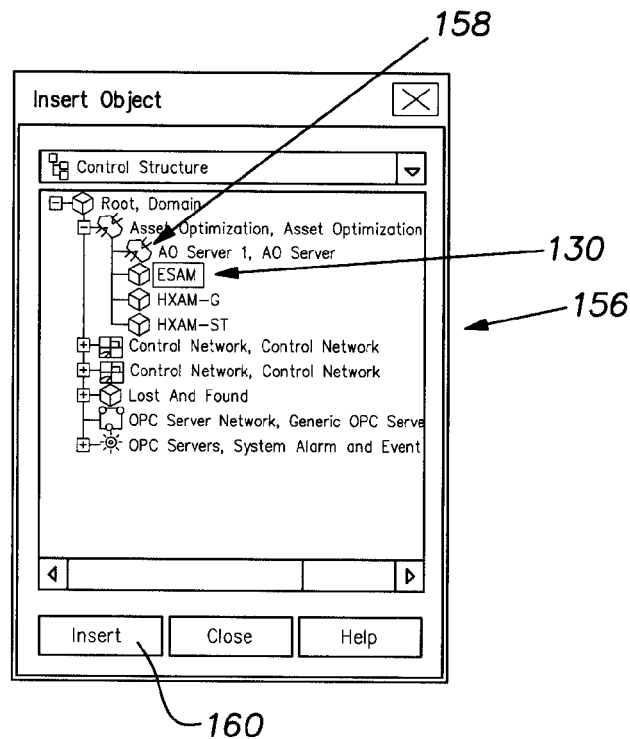
FIG. 11 is a screenshot of a window in the plant explorer workplace for assigning the ESAM object to an object for a motor monitored by a stand-alone AM/CM system.
Figure 12:
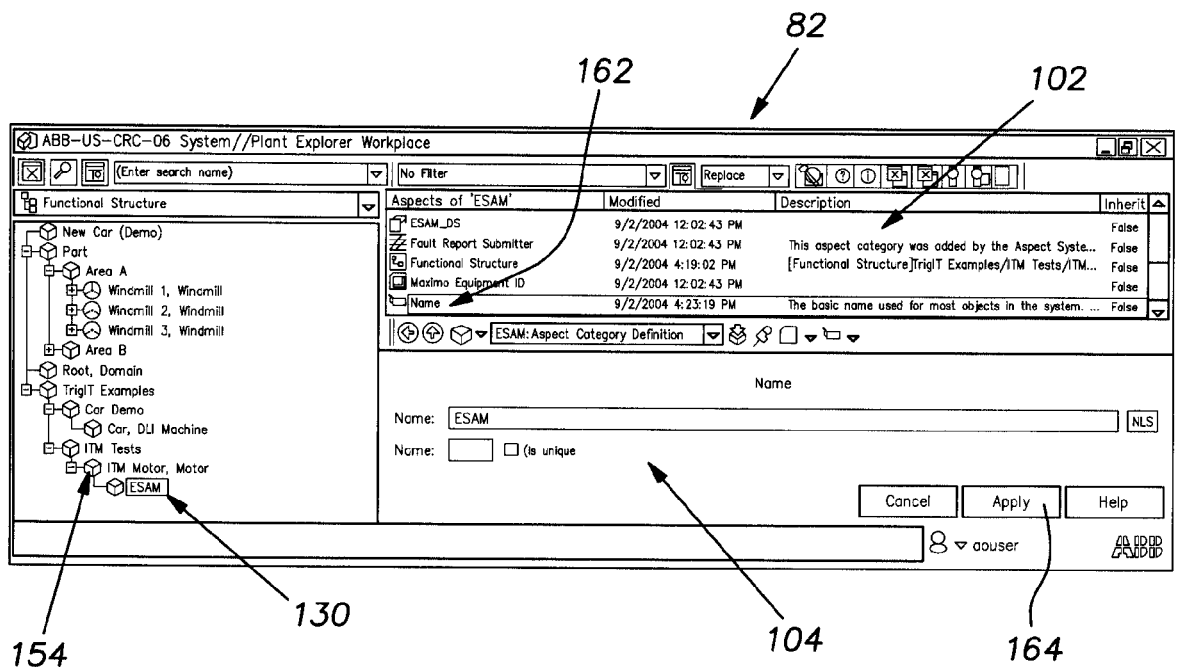
FIG. 12 is a screenshot of the plant explorer workplace showing the ESAM object under the object for the motor before the ESAM object is modified to form a new AM object.
Figure 13:
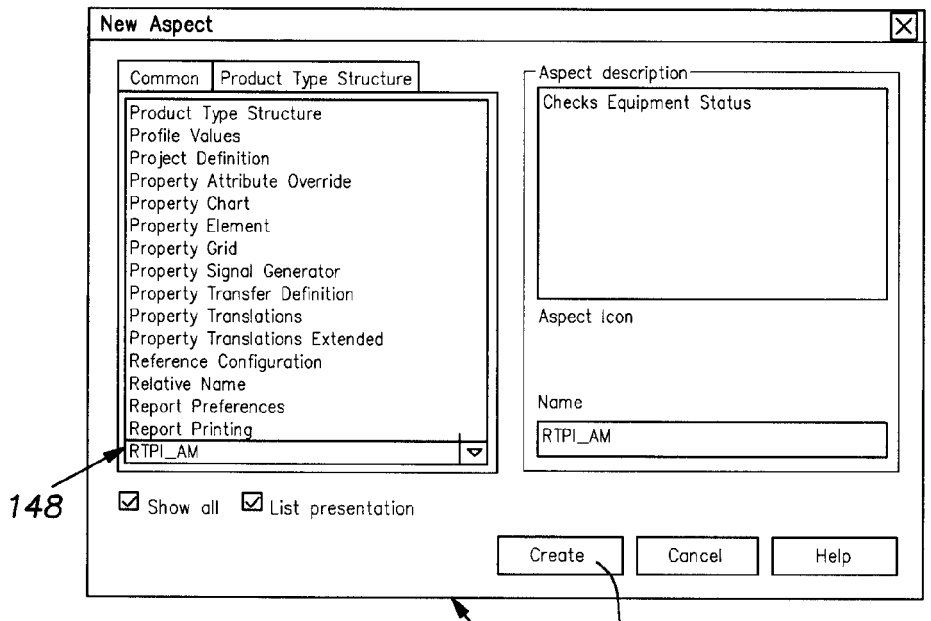
FIG. 13 is a screenshot of a pop-up menu in the plant explorer workplace for assigning the new AM aspect to the new AM object to produce a new asset monitor.
Figure 14:
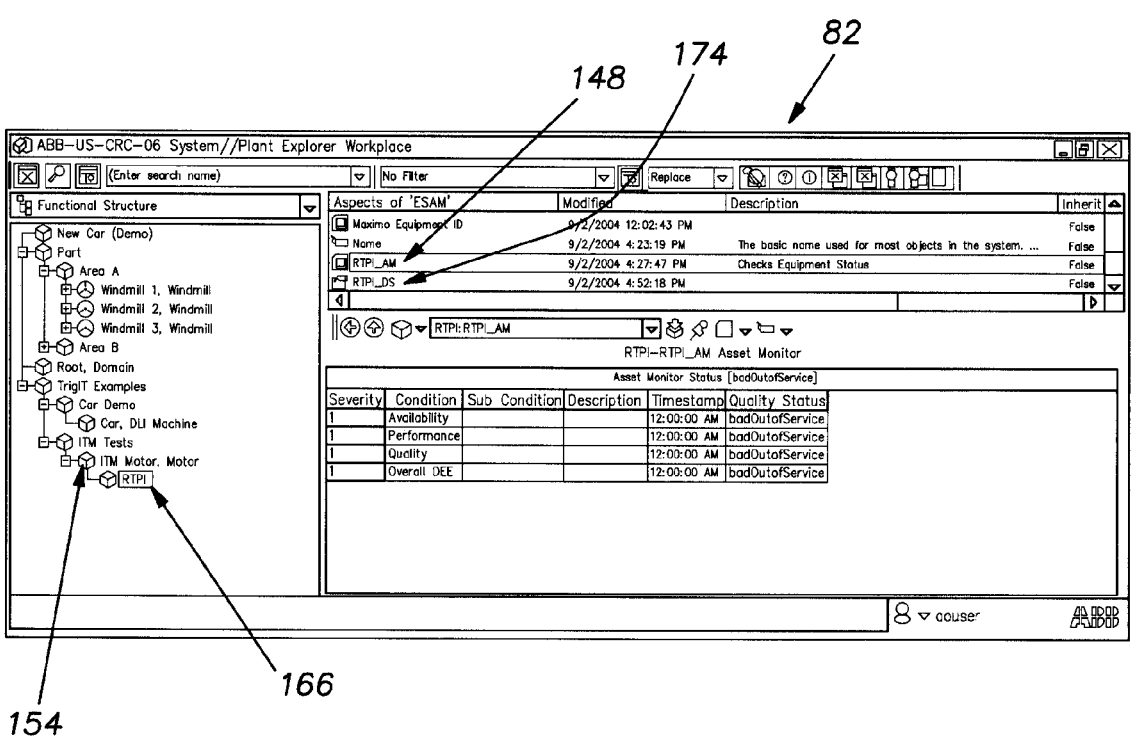
FIG. 14 is a screenshot of the plant explorer workplace showing the new AM object under the object for the motor.

After the new AM aspect 148 has been created and modified, the ESAM object 130 and the new AM aspect 148 are assigned to an object 154 for the motor 14 monitored by the AM/CM system 24. The object 154 for the motor 14 is first located in the functional or location structure of the plant explorer workplace 82 and is then right-clicked on, which causes a pop-up menu (not shown) to appear. An "Insert Object" task is selected from the pop-up menu, which causes a window 156 to appear, as shown in FIG. 11. In the window 156, an object 158 for the asset monitoring server 110 is expanded to locate the ESAM object 130. The ESAM object 130 is selected and an "insert" button 160 is clicked on. Once this procedure is complete, the functional or location structure of the plant explorer workplace 82 is once again accessed. The ESAM object 130 is now located under the object 154, as shown in FIG. 12. The name of the ESAM object 130 is then changed by selecting a "name" aspect 162 for the ESAM object 130 in the aspect list area 102 of the plant explorer workplace 82, entering a new desired name in the preview area 104 and clicking on an apply button 164. The new name may be indicative of the AM/CM system 24 and/or an asset it is monitoring. For example, the name of the ESAM object 130 may be changed to "RTPI". In this manner, the ESAM object 130 is copied to create a new AM object 166, which contains all of the standard aspects used by the asset optimization system 68, except for the new AM aspect 148, which still needs to be added. The new AM aspect 148 is added by selecting the new AM object 166 from the functional or location structure of the plant explorer workplace 82 and right-clicking on the new AM object 166 to produce a pop-up menu 168 (shown in FIG. 13) that displays a list of available aspects. The new AM aspect 148 is selected from the list and a "create" button 170 is clicked on. The new AM object 166 now has the new AM aspect 148, as shown in FIG. 14. The new AM object 166 and the new AM aspect 148 are referred to collectively as the new Asset Monitor 172.

Once the new AM object 166 and the new AM aspect 148 are created, the new AM object 166 is provided with a data source aspect 174, which receives condition data strings from the OPC DA server 76, which, in turn, receives the condition data strings 46 from the OPC DA server 40 of the AM/CM system 24. The data source aspect 174 is provided with a name having the following format: <name of new AM object>_DS. Thus, if the name of the new AM object 166 is "RTPI", the name of the data source aspect 174 is RTPI_DS, as is shown in FIG. 14. The data source aspect 174 may be generated by copying a control connection aspect of an object for the OPC server network 126 and then renaming the copied aspect.

As can be appreciated from the foregoing description, the duplication and modification of the ESAM 126 to create a new asset monitor is a quick and simple method for making information from a stand-alone AM/CM system accessible in a process automation system.

Asset Reporter and Viewer (Including Thin Client)

Figure 15:
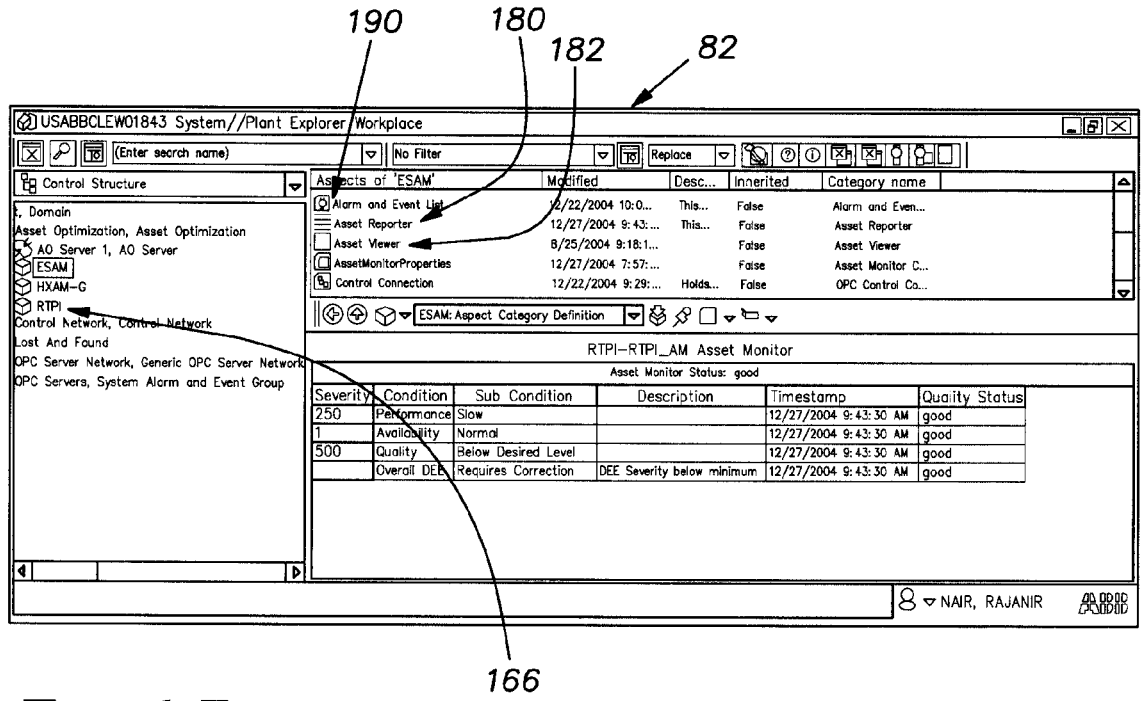
FIG. 15 is a screenshot of the plant explorer workplace showing a view of the condition table of the new AM aspect.

An asset reporter aspect 180 is provided for the new AM object 166 in the plant explorer workplace 82, as shown in FIG. 15. Asset reporter aspects may also be provided for the other objects with asset monitors. For example, an asset reporter aspect (not shown) may be provided for the object 120. An asset reporter aspect for an object provides a detailed view of all asset monitor conditions and subconditions for an asset represented by the object. In addition, the asset reporter aspect displays a severity indicator for the object itself.

Figure 16:
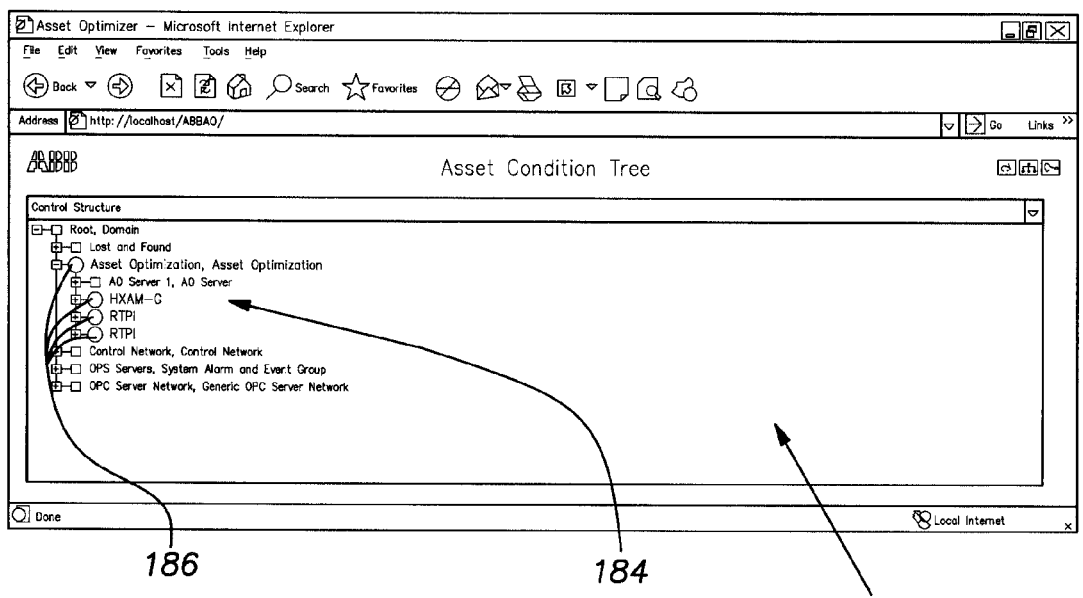
FIG. 16 is a screenshot showing a thin client view of an asset condition tree.

An asset viewer aspect 182 is also provided for the new AM object 166, as shown in FIG. 15. Asset viewer aspects may also be provided for the other objects with asset monitors. For example, an asset viewer aspect may be provided for the object 120. For a particular object, the asset viewer aspect associated with the object displays the object and all of its child objects in an asset condition tree 184 in the aspect object area 100 of the plant explorer workplace 82, as well as in the operator workplace 80. The asset viewer aspect 182 is also accessible as a web-enabled view 185 (shown in FIG. 16) on a remote client that is not part of the process automation system 30, i.e., a thin client. A thin client, such as the remote client 36 in FIG. 2, accesses the asset viewer aspect 182 through a web server on the machine hosting the asset monitoring server 110. The statuses of the objects in an asset condition tree 184 are displayed via icons 186 associated with the objects, respectively. Each icon 186 for an object represents the composite severity of its child objects, i.e., the highest severity of a child object. The form of an icon 186 for an object is based on the highest severity number of the subconditions from the asset monitors of the child objects. For example, when all of the subconditions have a severity number of one, the icon 186 will be a check mark, which indicates normal subconditions; when the highest severity number of the subconditions is between 2 and 250, the icon 186 will be an "i" in a white bubble, which indicates a non-normal subcondition of low severity; when the highest severity number of the subconditions is between 251 and 500, the icon 186 will be a blue flag, which indicates a non-normal subcondition of medium severity; when the highest severity number of the subconditions is between 501 and 750, the icon 186 will be a yellow caution triangle, which indicates a non-normal subcondition of high severity; and when the highest severity number of the subconditions is between 751 and 1,000, the icon 186 will be a red circle with a cross through it, which indicates a non-normal subcondition of very high severity. The icons 186 may be preset, or may be configurable by enterprise personnel. In the operator and plant explorer workplaces 80, 82, the statuses of the objects in an asset condition tree 184 are dynamically updated. In a thin client view of an asset condition tree 184, however, the statuses of the objects are only updated through a manual refresh.

The statuses of the objects and the subconditions thereof that are displayed in an asset condition tree 184 and the asset reporters are determined by the asset condition documents 114 issued by the asset monitors 70. When an asset monitor 70 issues an asset condition document 114 for a change in status (i.e., a new subcondition is met), the icon 186 displayed in the asset condition tree 184 and the color of the subcondition in the corresponding asset reporter are changed. In addition, if the change in status is from normal or OK to an abnormal condition, an alarm and an electronic fault report 188 are automatically created.

NOTIFICATION (A&E). An alarm and event list aspect 190 is provided for the new AM object 166, as shown in FIG. 15. Alarm and event list aspects may also be provided for the other objects with asset monitors. For example, an alarm and event list aspect may be provided for the object 120. For each object with an alarm and event list aspect, the alarm and event list aspect provides a view in the preview area 104 that shows all alarms and events generated by the object, including the severity and time of occurrence of the alarms and events.

Figure 17:
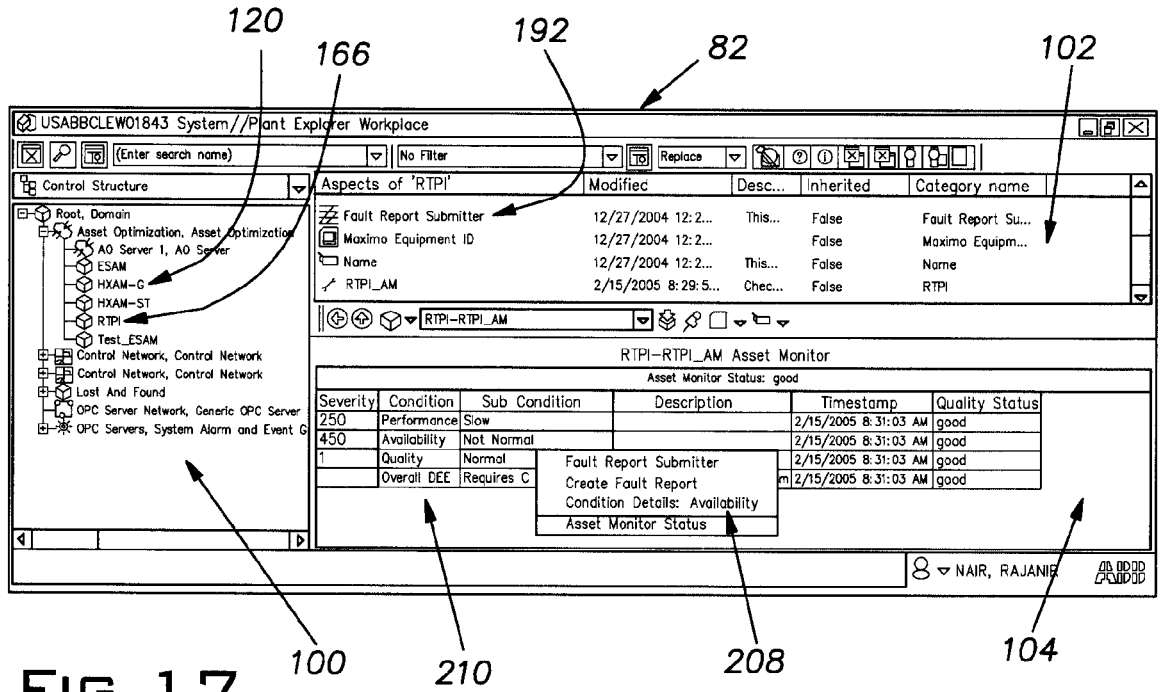
FIG. 17 is a screenshot of the plant explorer workplace showing a view of the condition table of the new AM aspect with a pop-up menu.
Figure 18:
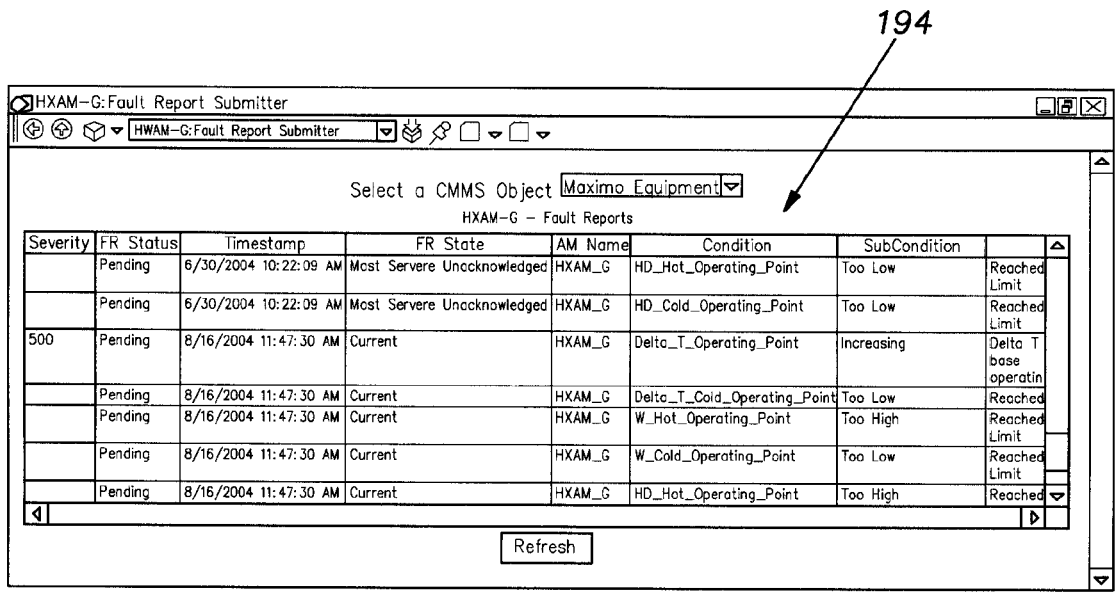
FIG. 18 is a screenshot of the plant explorer workplace showing a fault report viewer for a heat exchanger asset monitor.

NOTIFICATION (CMMS). A fault report submitter aspect 192 is provided for the new AM object 166, as shown in FIG. 17. Fault report submitter aspects may also be provided for the other objects with asset monitors. For example, a fault report submitter aspect may be provided for the object 120. A fault report submitter aspect may be accessed from the aspect list area 102, or from an asset condition tree 184 or an asset reporter by right clicking on the relevant icon in the asset condition tree 184 or the subcondition in the asset reporter, as the case may be, which produces a pop-up context menu that provides access to the fault report submitter aspect. Each fault report submitter aspect has a fault report viewer that shows all fault reports 198 for an associated asset monitor. For example, the fault report submitter aspect for the object 120 has a fault report viewer 194 that shows the fault reports that have been issued by the asset monitor 108, as is shown in FIG. 18. Right-clicking anywhere in a fault report row produces a context menu with the option to dismiss or submit the fault report 198. If the fault report 198 is to be submitted, a submit fault report view is launched. For example, a submit fault report view 196 for the fault reporter aspect for the object 120 is shown in FIG. 19. The submit fault report view 196 includes a description of the work that should be performed (work order) and a submit button 199. The WO description contains the fault diagnosis and recommended remedial action. When a user clicks the submit button 199 in the submit fault report view 196, the fault report 198, containing the information from the submit fault report view is submitted to the CMMS 32 and the FDCMS 34.

Referring now to FIGS. 2 and 3, the CMMS 32 runs on a CPU 200 of a computer 202 that is connected to the process automation system 30 by network 38. The CMMS 32 generates, issues and tracks job plans, work orders 204 and preventive maintenance schedules for the assets 12 of the enterprise 10. A work order 204 from the CMMS 32 is electronic and contains comprehensive and detailed information for work that needs to be performed on an asset 12. Such information includes a description of the work that needs to done and a plan and a schedule for performing the work. Such information also typically includes the amount, type and cost of labor, material and equipment required to perform the work. A work order 204 may also reference or include information from failure analysis and safety-related documents. A work order 204 is transmitted to maintenance personnel who will perform the work order 204 to remedy the fault of the concerned asset.

When the CMMS 32 receives a fault report 198 from the process automation system 30 for an asset 12, the CMMS 32 creates a work order 204 for the asset 12. A work order aspect (not shown) is provided for the new AM object 166 and may be provided for other objects with asset monitors. For example, a work order aspect is provided for the object 120. A work order aspect for an object provides a view of all of the work orders that are open or active for the asset 12 to which the object corresponds. For example, the work order aspect for the object 120 has a view 206 that shows at least three work orders (namely, 5071, 5070, 5069) that are open for the heat exchanger 16, as shown in FIG. 20. A work order column in a view contains links to the CMMS 32. Clicking on a link for a particular work order opens a portal that contains a CMMS view of the work order 204.

Web Views

Figure 22:
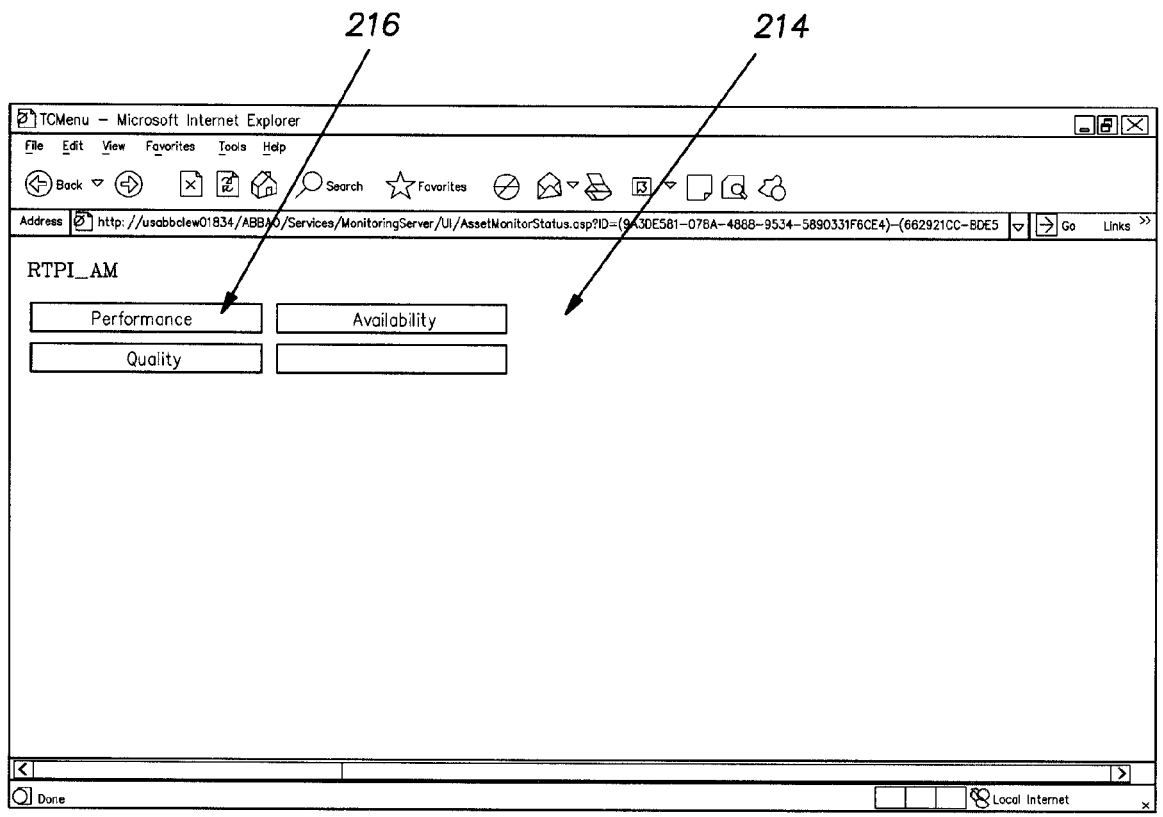
FIG. 22 is a screenshot of the plant explorer workplace showing a page with a plurality of buttons for accessing URLs of conditions of the new asset monitor.

The URLs for the conditions of the new Asset Monitor 172 (which are contained in the data strings 46 received from the AM/CM system 24) are accessed through the new AM aspect 148. As shown in FIG. 17, the new AM aspect 148 provides an asset monitor view 210 in the preview area 104. Status details of the new Asset Monitor 172 can be viewed through the asset monitor view 210 by first right-clicking on any condition to produce a pop-up menu 208. The "Asset Monitor Status" is clicked on in the pop-up menu 208, which opens a new window 212 (shown in FIG. 21) that shows the status of the new Asset Monitor 172. Clicking on "Asset URL" opens a new page 214 (shown in FIG. 22) that displays a plurality of buttons 216 for the URLs of the conditions of the new Asset Monitor 172. The buttons 216 are color coded to indicate the severities of the associated conditions. Clicking on any button 216 will cause the web page at the respective URL to be displayed.

In addition to the condition URLs of the new Asset Monitor 172, URLs may be created for all of the asset monitor aspects, asset reporter aspects, fault report submitter aspects and active work order aspects, thereby permitting a thin client such as the remote client 36 to access said aspects. The foregoing aspects of an object can be accessed from the thin client view of an asset condition tree 184 by right-clicking on the object, which causes a context menu to be displayed. The context menu lists the aspects that are available for access through the web browser of the thin client. A desired aspect is accessed by clicking on the aspect in the context menu.

While the invention has been shown and described with respect to particular embodiments thereof, those embodiments are for the purpose of illustration rather than limitation, and other variations and modifications of the specific embodiments herein described will be apparent to those skilled in the art, all within the intended spirit and scope of the invention. Accordingly, the invention is not to be limited in scope and effect to the specific embodiments herein described, nor in any other way that is inconsistent with the extent to which the progress in the art has been advanced by the invention.

What is claimed is:

1. In an enterprise having an asset, a method of monitoring the asset comprising:
providing at least one computer with a viewing monitor;
providing a stand-alone software system for monitoring the asset, said stand-alone software system being runnable on said at least one computer and being operable to transmit data items for a condition of said asset;
providing a process automation software system runnable on said at least one computer and including a human system interface (HSI) and a generic asset monitor having a changeable condition table with a generic condition entry;
modifying said generic asset monitor to create a custom asset monitor specific to said asset, said modifying including changing said generic condition entry in said condition table to correspond to said condition of said asset;
generating a web rage containing information about said condition;
transmitting said data items in a single data string from said stand-alone software system, said data items including a description of said condition, a status of said condition and a Uniform Resource Locator for said web page;
receiving said data items from said stand-alone software system in said process automation software system;
parsing said data string;
monitoring said status of said condition in said custom asset monitor; and
displaying said status and said description of said condition in said HSI.

2. The method of claim 1, wherein said stand-alone software system is operable to transmit data items for a plurality of conditions of said asset, wherein said generic condition entry is changed to correspond to a first one of said plurality of conditions, and wherein said modifying step further comprises adding a second condition entry to said condition table, said second condition entry corresponding to a second one of said plurality of conditions.

3. The method of claim 1, wherein said status of said condition is a normal subcondition indicating a normal operating condition of said asset or an abnormal subcondition indicating an abnormal operating condition of said asset.

4. The method of claim 3, wherein when said status is said abnormal subcondition, said data items further comprise a possible cause of said abnormal operating condition of said asset and a suggested action to take to remedy said abnormal operating condition.

5. The method of claim 4, further comprising: when said status is said abnormal subcondition, transmitting an asset condition document from said custom asset monitor to said HSI, said asset condition document containing said abnormal subcondition, said possible cause and said suggested action.

6. The method of claim 5, wherein the asset condition document is an Extensible Markup Language document.

7. The method of claim 5, further comprising: transmitting said asset condition document to a maintenance management system.

8. The method of claim 1, further comprising: representing said asset as an object in the HSI; and integrating said custom asset monitor into said object as an aspect of said object.

9. The method of claim 1, further comprising:
displaying an icon representative of said Uniform Resource Locator;
clicking on said icon; and
displaying said web page in response to clicking on said icon.

10. The method of claim 1, wherein said stand-alone software system is operable to monitor a plurality of conditions of said asset, and wherein said method further comprises:
generating web pages containing information about said conditions, respectively;
transmitting a plurality of data strings from said stand-alone software system, each data string including a description of one of said conditions, a status of said one of said conditions and a Uniform Resource Locator for one of said web pages for said one of said conditions; and displaying icons representative of said Uniform Resource Locators in a single view.

11. A system for monitoring an asset of an enterprise, said system comprising:

at least one computer with a viewing monitor;

a stand-alone software system for monitoring the asset, said stand-alone software system being runnable on said at least one computer and being operable to generate a web page and to transmit data items for a condition of said asset, said data items being transmitted in a single string and including a description of said condition, a status of said condition, and a Uniform Resource Locator for said web page;

a process automation software system runnable on said at least one computer and including a human system interface (HSI) and a generic asset monitor having a changeable condition table with a generic condition entry;

a software development tool operable to make modifications to said generic asset monitor to create a custom asset monitor specific to said asset, said modifications including changing said generic condition entry in said condition table to correspond to said condition of said asset; and a communication network connecting said process automation software system to said stand-alone software system so that said process automation software system can receive said data items from said stand-alone software system; and wherein said custom asset monitor is operable to monitor said status of said condition and wherein said HSI is operable to display said data items on said viewing monitor of said at least one computer.

12. The system of claim 11, wherein said status of said condition is a normal subcondition indicating a normal operating condition of said asset or an abnormal subcondition indicating an abnormal operating condition of said asset;

wherein when said status is said abnormal subcondition, said data items further comprise a possible cause of said abnormal operating condition of said asset and a suggested action to take to remedy said abnormal operating condition; and wherein said data items are transmitted in a single string.

13. The system of claim 12, wherein said custom asset monitor is operable to generate and transmit an asset condition document when said status is said abnormal subcondition, said asset condition document being an Extensible Markup Language document and containing said abnormal subcondition, said possible cause and said suggested action.

* * * * *